Figures 1, 2:
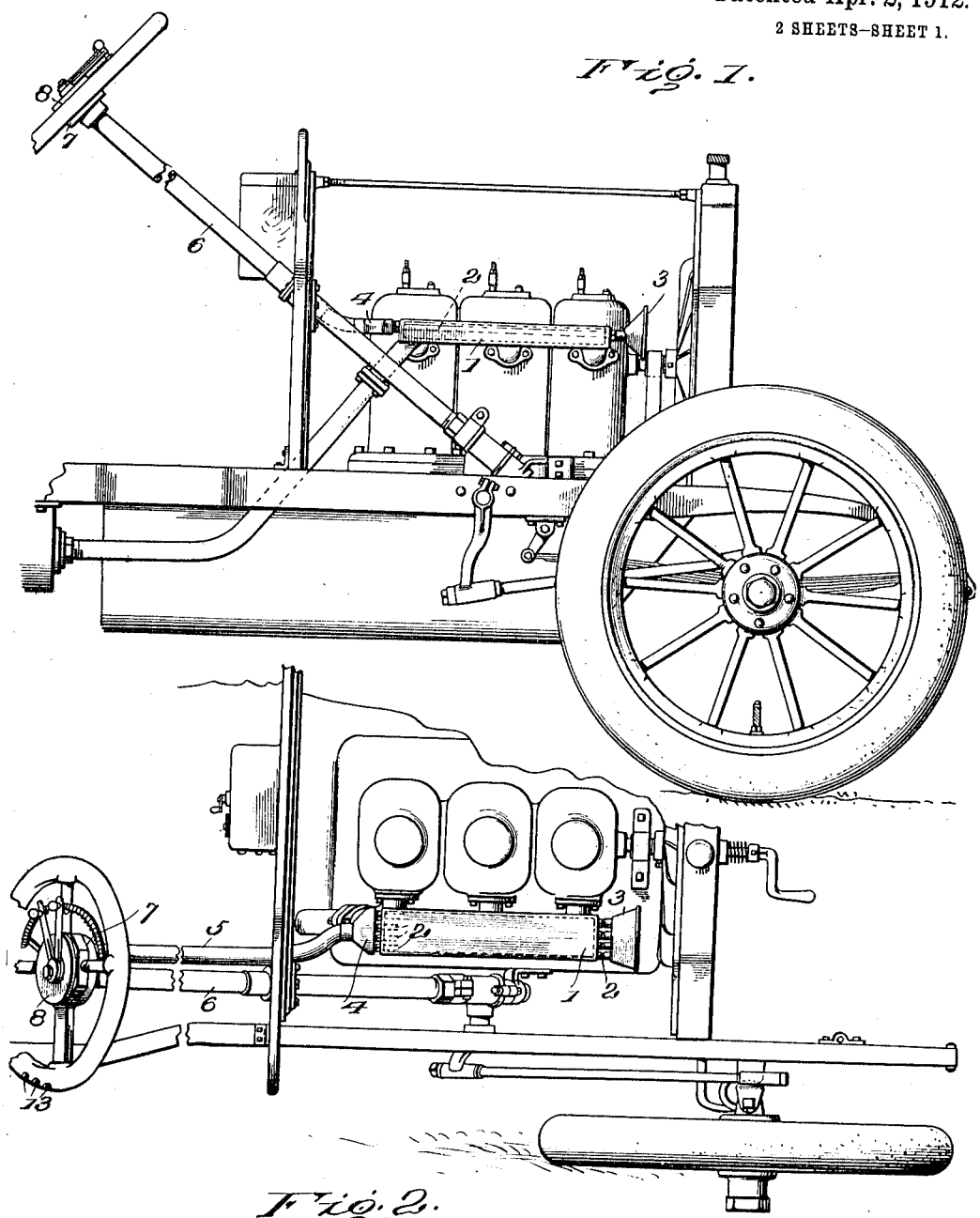

G. E. SMITH.
MEANS FOR HEATING AUTOMOBILE STEERING WHEELS.
APPLICATION FILED MAR. 17, 1911.

1,022,273.

Patented Apr. 2, 1912.

2 SHEETS—SHEET 1.

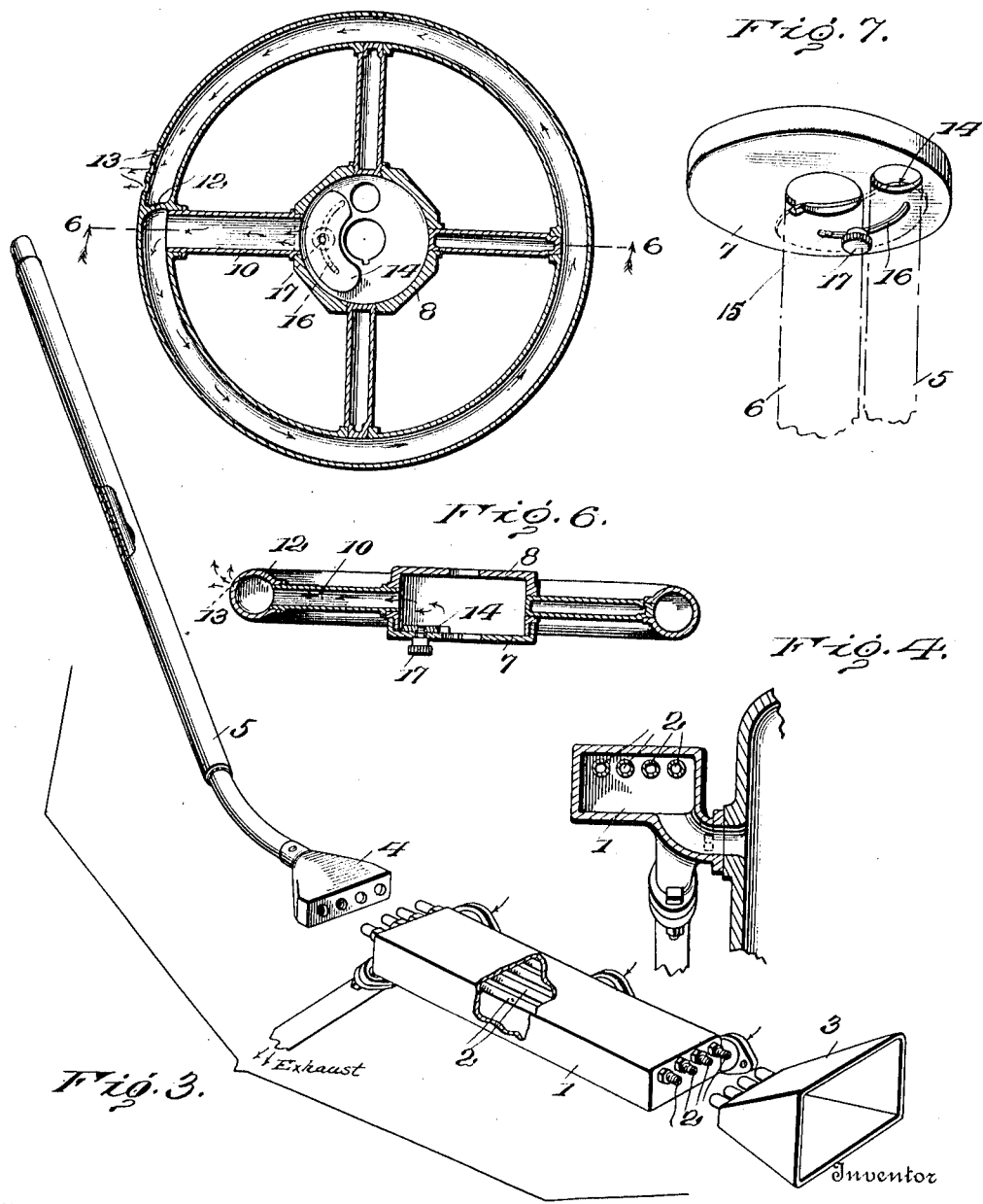

UNITED STATES PATENT OFFICE.

GRANT E. SMITH, OF POUGHKEEPSIE, NEW YORK.

MEANS FOR HEATING AUTOMOBILE STEERING-WHEELS.

1,022,273.  Specification of Letters Patent.  Patented Apr. 2, 1912.

Application filed March 17, 1911. Serial No. 615,100.

*To all whom it may concern:*

Be it known that I, GRANT E. SMITH, of Poughkeepsie, in the county of Dutchess and State of New York, have invented certain new and useful Improvements in Means for Heating Automobile Steering-Wheels; and I do hereby declare the following to be a full, clear, and exact description of the invention, such as will enable others skilled in the art to which it appertains to make and use the same.

Heretofore it has been proposed to employ the exhaust gases of an automobile engine to heat the steering wheel; and it has also been suggested that the water which circulates around the engine might be used for the same purpose. The objections to the use of the exhaust gases are numerous. In the first place any deflection thereof is attended with great difficulty, involving more or less expense, or interference with the smooth running of the engine. Furthermore, it is very difficult to properly heat the steering wheel by the exhaust gases, and the discharge of such gases from the wheel is a serious proposition, since they cannot be discharged within the car itself, and in consequence special means have to be provided for conveying the gases from the wheel. This is also true when the circulating water is depended upon, and there then exists the further objection that all joints must be perfectly tight—a condition hard to maintain in an automobile.

The primary object of this invention is, therefore, to effect the heating of the steering wheel of a motor-vehicle by means of fresh air heated by the engine, the heated air being caused to travel through the rim of the wheel and discharge directly therefrom into the atmosphere.

The invention will be hereinafter fully set forth and particularly pointed out in the claims.

In the accompanying drawings, Figure 1 is a view in side elevation of a portion of an automobile equipped with my improvements. Fig. 2 is a plan view of the parts shown in Fig. 1. Fig. 3 shows the heater parts and connecting pipe disjointed. Fig. 4 is a transverse section through the heater. Fig. 5 is a horizontal sectional view of the steering wheel. Fig. 6 is a cross section on line 6—6, Fig. 5. Fig. 7 is a view in perspective of the fixed part of the wheel hub.

In carrying out my invention, the air which is to heat the steering wheel is heated by the engine, preferably by the exhaust gases, and the means employed for heating the air is so designed and arranged as not to interfere with the ordinary working of the engine. According to the means shown the manifold exhaust pipe 1, leading from the several explosion chambers, is especially designed to accommodate a series of pipes 2 which extend longitudinally therethrough, such pipes constituting air passages. These pipes may be secured to the exhaust pipe in any suitable manner, and at their receiving ends they connect to a funnel-like receptacle 3 which faces toward the front of the machine, the purpose of such receptacle being to induce the entrance of a relatively large amount of fresh air and cause it to pass through the pipes 2. These air pipes at their rear ends are connected by a coupling 4 to a pipe 5, said coupling being in the form of a triangular chamber having at one end a series of openings to accommodate the rear ends of pipes 2, and also having a reduced tubular portion which is detachably fitted to the end of pipe 5. This latter pipe is shown as paralleling the usual fixed tubular casing 6 through which extends the steering rod, as well as the throttle and spark control rods. The steering rod is, as customary, secured at its upper end to the steering wheel.

According to the means shown for carrying out my invention the steering wheel has a chambered hub composed of two parts, the lower part 7 being fixed on the casing 6, while the part 8 is capable of being rotated on the fixed part, the flanges of the two parts overlapping. The rim of the wheel is made hollow, and is connected by a series of spokes to hub part 8. One of the spokes, as 10, is hollow and preferably rectangular in cross section, while the other spokes are preferably solid or plugged at their inner ends, although if desired they also may be open throughout their lengths. The fixed part 7 of the wheel hub has an opening at one side of its center to receive the upper end of pipe 5 so that air after passing through the exhaust pipe and conveyed by said pipe 5 will be discharged into the hub of the steering wheel and pass through spoke 10 to the rim. This rim, immediately adjacent the outer end of spoke 10, has a partition 12, and adjoining such partition on one side are a series of escape openings 13. The hot air will, therefore, according to the preferred arrangement, have to travel entirely around the rim before finding its exhaust. Inasmuch as I use fresh air as the medium for heating the steering wheel, the discharge thereof at the side of the wheel is not only not objectionable but adds greatly to the comfort of the operator, and it is not essential that a tight fitting joint be formed between the two parts of the hub, as would be required if either the exhaust gases or hot water were used to heat the wheel rim.

For the purpose of enabling the operator to entirely cut off or control the supply of heated air to the wheel, I provide the fixed hub part 7 with a sliding valve 14 which is designed to travel over an arc of a circle, and it is equipped with a guiding lug 15 which fits in a slot 16 of the part 7. The valve also has a handle 17 which projects through slot 16, and this handle is preferably in the form of a set screw so that the valve may be locked at any desired point. While I prefer to have the air pipes pass on straight lines through the exhaust manifold, yet if desired the passage thereof may be otherwise arranged.

I do not confine myself to the exact arrangement shown for heating the air; nor do I confine myself to the exact construction and arrangement of the various parts hereinbefore described, since it is manifest that changes may be made in the construction and arrangement without departing from the spirit of my invention.

I claim as my invention:

1. The combination with a motor vehicle, and an engine therefor, of an air-receptacle designed to be heated by the engine, a pipe leading from said receptacle, and a steering-wheel with which said pipe communicates, said steering-wheel having a hollow rim provided with an inlet and an outlet for the heated air, the outlet being directly from the wheel rim into the atmosphere.

2. In combination with a motor vehicle, and an engine therefor, of an air-receptacle designed to be heated by the engine, a pipe leading from said receptacle, and a steering-wheel with which said pipe communicates, said steering-wheel having a hollow portion provided with an inlet and an outlet for the heated air, the outlet being directly from the hollow portion into the atmosphere.

3. The combination with a motor vehicle, and an engine therefor, of an air-receptacle designed to be heated by the engine, a pipe leading from said receptacle, a steering-wheel having a chambered hub and a hollow rim communicating with said hub, said hub having a part to which said pipe is connected, and said rim having an outlet for the hot air opening directly into the atmosphere.

4. The combination with a motor vehicle, and an engine therefor, of an air-receptacle designed to be heated by the engine, a pipe leading from said receptacle, a steering-wheel having a chambered hub and a hollow portion communicating with said hub, said hub having a fixed part to which said pipe is connected, and said hollow portion having an air outlet, and a fixed tubular casing paralleling said pipe and upon which said fixed hub part is centrally mounted.

5. The combination with a motor vehicle, and an engine therefor, of an air-receptacle comprising a pipe or pipes passed through a portion of the engine so as to be heated thereby, a supply pipe leading from the former pipe or pipes, and a steering-wheel having a chambered hub and a hollow rim communicating with said hub, said hub having a fixed part to which said supply pipe is connected, and said rim having an air-outlet.

6. The combination with a motor vehicle, and an engine therefor, of an exhaust pipe for the engine having a series of air pipes passed longitudinally therethrough, a funnel-like receptacle to which the receiving ends of said pipes are connected, a supply pipe leading from said pipes and a steering-wheel having a hollow rim and a chambered hub in communication with each other, said rim having an air-outlet and said hub having a fixed part into which said supply pipe opens.

7. The combination with a motor vehicle, and an engine therefor, of an exhaust pipe for the engine having a series of air pipes passed longitudinally therethrough, a funnel-like receptacle to which the receiving ends of said pipes are connected, a supply pipe leading from said pipes, a steering-wheel having a hollow rim and a shambered hub in communication with each other, said rim having an air-outlet, said supply pipe opening into said hub which latter has a fixed part and a casing upon which said fixed part of the hub is mounted, said supply pipe paralleling said casing.

8. The combination with a motor vehicle, and an engine therefor, of an air receptacle designed to be heated by the engine, a steering wheel having a hollow rim and a chambered hub, said rim having an air-outlet and said hub being composed of a fixed part and a movable part, the hub being in communication with the hollow rim, a central support for said fixed part, a pipe connected with said air-receptacle paralleling said fixed support and opening into said hub through said fixed part, and a valve mounted on said fixed part for controlling the heated air supply to said hub.

9. The combination with a motor vehicle, and an engine therefor, of an air-receptacle designed to be heated by the engine, a steering-wheel having a hollow rim and a chambered hub, said rim having an air-outlet and said hub being composed of a fixed part and a movable part, the hub being in communication with the hollow rim, a central support for said fixed part, a pipe connected with said air-receptacle, paralleling said fixed support and opening into said hub through said fixed part, and a valve movable on an arc on said fixed part for controlling the fluid supply to said hub, and means for holding said valve in different positions.

In testimony whereof, I have signed this specification in the presence of two subscribing witnesses.

GRANT E. SMITH.

Witnesses:
 FRANCIS S. MAGUIRE,
 FRANK J. ALLEN.